(12) United States Patent
Kern

(10) Patent No.: US 12,246,478 B2
(45) Date of Patent: Mar. 11, 2025

(54) INJECTION MOLD WITH A VALVE PIN AND ACTUATOR ASSEMBLY

(71) Applicant: OTTO MÄNNER GMBH, Bahlingen (DE)

(72) Inventor: Patrick Kern, Endingen (DE)

(73) Assignee: OTTO MÄNNER GMBH, Bahlingen (DE)

( * ) Notice: Subject to any disclaimer, the term of this patent is extended or adjusted under 35 U.S.C. 154(b) by 0 days.

(21) Appl. No.: 17/769,187

(22) PCT Filed: Oct. 2, 2020

(86) PCT No.: PCT/EP2020/077752
§ 371 (c)(1),
(2) Date: Apr. 14, 2022

(87) PCT Pub. No.: WO2021/094034
PCT Pub. Date: May 20, 2021

(65) Prior Publication Data
US 2024/0100753 A1 Mar. 28, 2024

(30) Foreign Application Priority Data
Nov. 14, 2019 (DE) .......................... 102019130792.9

(51) Int. Cl.
*B29C 45/00* (2006.01)
*B29C 45/28* (2006.01)

(52) U.S. Cl.
CPC .... *B29C 45/281* (2013.01); *B29C 2045/2813* (2013.01)

(58) Field of Classification Search
CPC ...................... B29C 45/281; B29C 2045/2813
See application file for complete search history.

(56) References Cited

U.S. PATENT DOCUMENTS 5,720,433 A * 2/1998 Forker .............. B05C 17/00526
137/496
7,225,953 B1 * 6/2007 Tooman ................ B29C 45/281
222/597

(Continued)

FOREIGN PATENT DOCUMENTS

DE    20 2015 001 943 U1    5/2015
DE    202015001943    *    5/2015    ......... B29C 45/2806

(Continued)

OTHER PUBLICATIONS

DE-202015001943 (Otto) May 2015 (online machine translation), [Retrieved on Feb. 21, 2024]. Retrieved from: Espacenet (Year: 2015).*
EPO (Riswijk, NL), English language version of the International Search Report, Form PCT/ISA/210, for International Application PCT/EP2020/077752, Jan. 15, 2021 (2 pages).

(Continued)

*Primary Examiner* — Alison L Hindenlang
*Assistant Examiner* — Andres E. Behrens, Jr.
(74) *Attorney, Agent, or Firm* — CANTOR COLBURN LLP

(57) ABSTRACT

An injection mold includes an actuator assembly, which further includes an actuator plate for moving at least one valve pin during production in an axial direction and a valve pin coupling device. The valve pin coupling device allows a manually controllable coupling and decoupling of the actuator plate and the valve pin.

20 Claims, 6 Drawing Sheets

(56) References Cited

U.S. PATENT DOCUMENTS

| | | | |
|---|---|---|---|
| 11,766,817 B2* | 9/2023 | Tabassi | B29C 45/18 |
| | | | 425/564 |
| 2003/0151165 A1* | 8/2003 | Colonico | B29C 45/2806 |
| | | | 425/572 |
| 2004/0191357 A1* | 9/2004 | Babin | B29C 45/2701 |
| | | | 425/573 |
| 2009/0148551 A1* | 6/2009 | Feick | B29C 45/281 |
| | | | 425/564 |
| 2011/0086121 A1* | 4/2011 | Bouti | B29C 45/2806 |
| | | | 425/151 |
| 2011/0304075 A1 | 12/2011 | Catoen et al. | |
| 2013/0129856 A1 | 5/2013 | Enrietti | |
| 2013/0323349 A1* | 12/2013 | Plumpton | B29C 45/281 |
| | | | 425/572 |
| 2015/0151473 A1* | 6/2015 | Olaru | B29C 45/232 |
| | | | 425/150 |
| 2017/0190088 A1* | 7/2017 | Hall | C07D 213/78 |
| 2018/0111299 A1 | 4/2018 | Moss et al. | |

FOREIGN PATENT DOCUMENTS

| | | |
|---|---|---|
| DE | 10 2015 216 059 A1 | 12/2015 |
| WO | WO 2012/011139 A1 | 1/2012 |
| WO | WO 2013/074741 A1 | 5/2013 |
| WO | WO 2014/009024 A2 | 1/2014 |

OTHER PUBLICATIONS

Chinese Office Action and Search Report for Chinese Application No. 202080076256.4; Report Mail Date Aug. 24, 2023—with English translation (14 Pages).

International Written Opinion for International Application No. PCT/EP2020/077752; International Filing Date Oct. 2, 2020; Report Mail Date Jan. 15, 2021 (6 Pages).

International Report on Patentability for International Application No. PCT/EP2020/077752; International Filing Date Oct. 2, 2020; Report Mail Date May 17, 2022 (7 Pages).

* cited by examiner

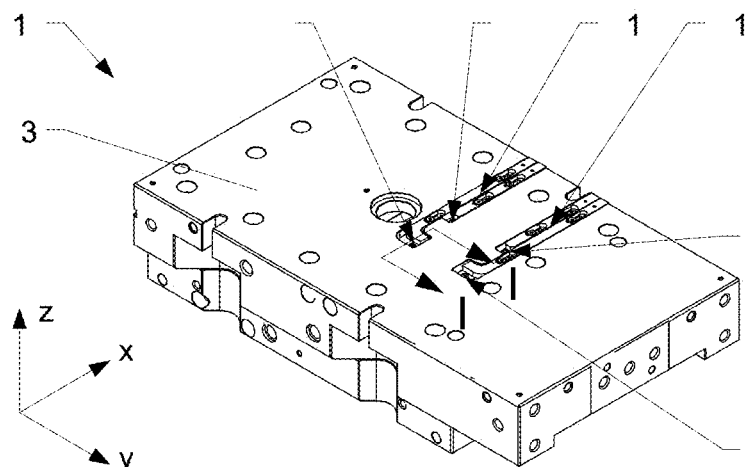
Fig. 3
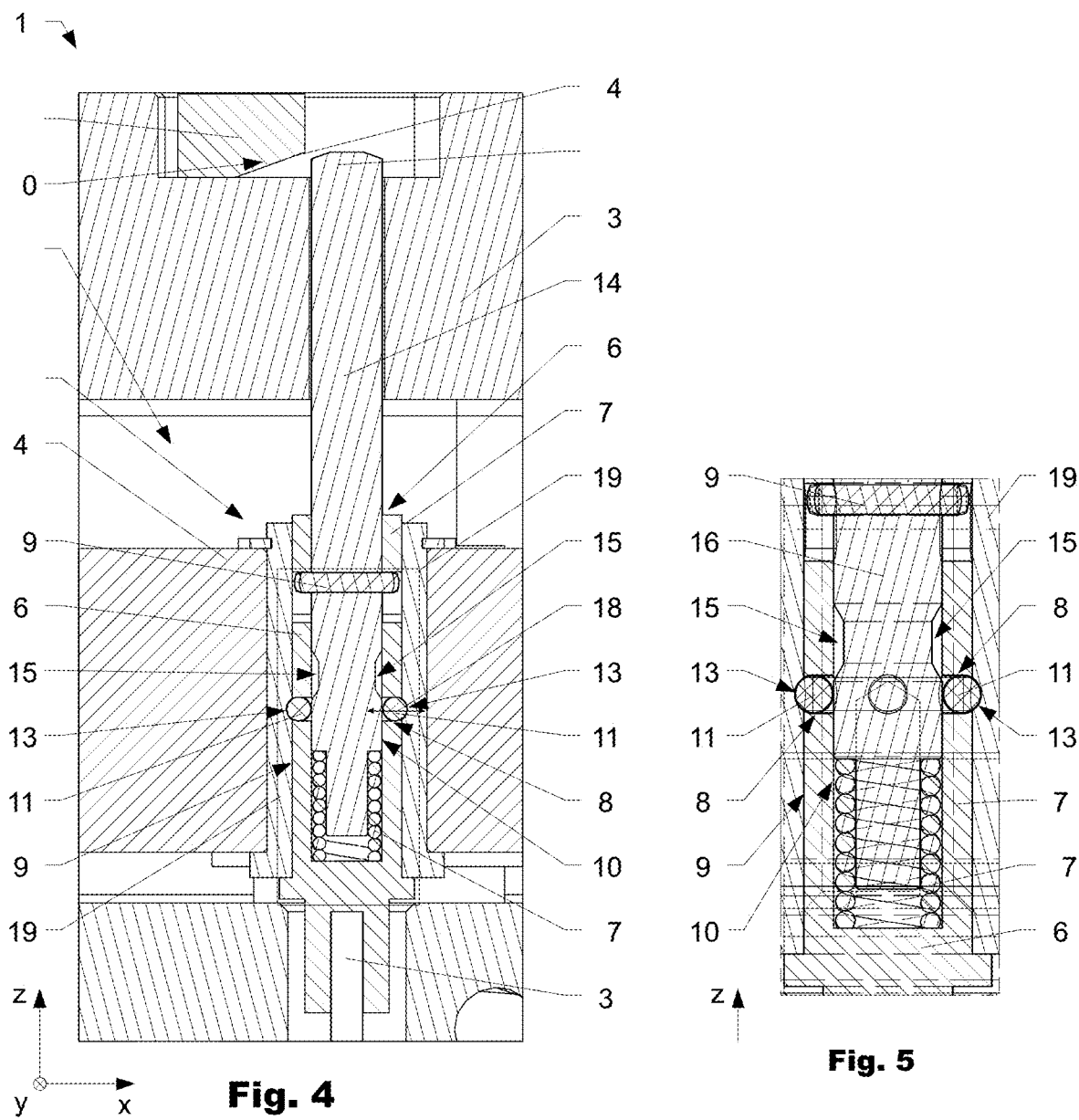
Fig. 4
Fig. 5

INJECTION MOLD WITH A VALVE PIN AND ACTUATOR ASSEMBLY

CROSS REFERENCE TO RELATED APPLICATION

This application is a National Phase filing in the United States, under 35 USC § 371, of PCT International Patent Application PCT/EP2020/077752, filed on 2 Oct. 2020 which claims the priority of German Patent Application DE 10 2019 130 792.9, filed 14 Nov. 2019.

These applications are hereby incorporated by reference herein in their entirety and is made a part hereof, including but not limited to those portions which specifically appear hereinafter.

FIELD OF THE INVENTION

The present disclosure lays in the field of injection molds for injection molding of plastics and other thermoplastic materials. More particularly it is directed towards an injection mold comprising a valve pin and an actuator assembly.

BACKGROUND OF THE INVENTION

From the prior art, injection molds comprising valve pins and actuator assemblies are known. These injection molds, often referred to as hot runner systems, in many cases use an actuator plate to facilitate a synchronous linear movement of thereto connected valve pins in order open and close valve gates connected to the cavities of the injection mold. An actuator plate usually pulls the valve pin from a valve gate opening to open the valve gate, so that molten plastic material can flow into the connected cavity. To stop the injection, the actuator plate pushes the pin to close the valve gate opening and stop the flow of molten plastic. These types of setups are ideal for synchronized filling of high cavitation molds. The overall construction is to be done in a way which allows a switchable coupling of the valve pins and the actuator plate, to provide an individual control of which cavities are active during production. This increases the safety of the injection mold, as malfunctioning parts of the injection mold can be inactivated and the production continued. Furthermore, a flexible decoupling of the valve pin and the actuator plate allows a varying number of cavities to be active during production, depending on the need.

US2011086121A1 first published in April 2011 in the name of Husky Injection molding disclosed is a safety connector for a hot runner having a valve stem and an actuation plate, the safety connector including: (i) a latch releasably interlocking the valve stem with the actuation plate so that in response to movement of the actuation plate, the valve stem becomes movable; and (ii) a latch mover being cooperative with the latch, and the latch mover being configured to move the latch responsive to a predetermined force acting on the valve stem so that the valve stem is released from the actuation plate.

WO2012011139A1 first published in January 2012 in the name of Thermoplay SpA relates to a closure assembly for the injection molding of plastic material comprising: a plurality of closing rods each associated with a respective nozzle or injection unit for the injection of the plastic material into a mold, and a driving plate, common to the plurality of closing rods. The driving plate is adapted to move between an open position and a closed position, between a bottom plate and the mold, to contemporarily drive the plurality of closing rods between a corresponding open and closed position respectively to open and to close an injection hole of the injection unit. Further there are disconnecting and fixing means associated with each closing rod provided for disconnecting it from the driving plate.

WO2013074741A1 first published in May 2013 in the name of Husky Injection molding relates to a mold-tool system, comprising: a stem-compliance assembly being configured to forcibly move a valve-stem assembly to a gate-closed condition for a case where an actuation-plate assembly fails to move the valve-stem assembly to the gate-closed condition.

WO2014009024A2 first published in January 2014 in the name of George Olaru relates to a hot runner injection molding apparatus including hot runner nozzles, a movable frame that can be displaced between at least two positions relative to a plurality of mold cavities, each cavity having a mold gate. Valve pins associated with the hot runner nozzles are individually coupled to the movable frame by a decouplable connector. Disengagement devices associated with the valve pins are activated to decouple any associated valve pin from the movable frame.

DE102015216059A1 first published in July 2015 in the name of Otto Männer Innovation GmbH relates to a valve needle decoupling device for an actuator plate of an injection molding machine which receives a valve needle which is movable by means of the actuator plate for controlling the supply of melt in a mold cavity along a needle axis. The decoupling device has at least one holding recess, at which the valve needle is connectable to the actuator plate.

A disadvantage of the prior art is that switching on or off individual cavities of an injection mold from the outside is not easily possible.

SUMMARY OF THE INVENTION

One object of the disclosure is to provide a solution for a high cavitation injection mold which allows to easily switch individual or groups of cavities on or off from outside of the injection mold.

An injection mold according to the disclosure therefore usually comprises an actuator assembly, which comprises a displaceable actuator plate for actuating at least one thereto coupled valve pin during operation in an axial direction. The actuator plate is preferably arranged in the axial direction between a top plate and a nozzle plate. The valve pin extends in the axial direction into the nozzle plate, in order to open and close a valve gate, which is in communication with a cavity of the injection mold. The actuator assembly comprises a special valve pin coupling device described hereinafter in more detail. This valve pin coupling device interconnect the valve pin and the actuator plate in the axial direction. In a preferred variation the valve pin coupling device is manually switchable between a coupled state and a decoupled state. In the coupled state the valve pin is in the axial direction interconnected to the actuator plate and moves along with it. Whereas in the decoupled state the valve pin is in the axial direction disconnected from the actuator plate and does not move with the actuator plate.

As there are different variations possible, subsequent the valve pin coupling device is described in a generic manner. Thereafter a more detailed description follows.

To achieve switchable coupling in the axial direction between the actuator plate and the valve pin, the valve pin coupling device comprises in a preferred variation a coupling device first part, a coupling device second part, as well as a coupling device switching element and at least one coupling means. The coupling device first part usually has a side wall extending in the axial direction and comprises at least one passage extending across the side wall from a first side face to a second side face. Inside the passage the at least one coupling means is arranged displaceable in the passage. The coupling means protrudes at least above one of the first side face or the second side face of the side wall. The coupling device second part is arranged adjacent to the first side face, comprising a coupling recess suitable to receive the coupling means protruding above the first side face. The coupling device switching element is arranged adjacent to the second side face and comprises a decoupling recess. The coupling device switching element is arranged displaceable with respect to the coupling device first part between a coupled first position and a decoupled second position. In the coupled first position the coupling means arranged in the passage of the coupling device first part is pressed via the coupling device switching element into the coupling recess of the coupling device second part, thereby coupling the coupling device first part and the coupling device second part. In the decoupled second position the coupling means arranged in the passage of the coupling device first part is partially arranged in the decoupling recess such that the coupling device first part and the coupling device second part are decoupled from each other.

To prevent an overload, meaning the actuator plate exerting a force onto the valve pin via the valve pin coupling device above a certain threshold, the coupling means can be arranged displaceable against the compression direction of a spring. The spring is usually arranged mechanically interconnected to the coupling means. A simple design is possible, when the spring forms part of and/or is accommodated in the valve pin switching element.

In a preferred variation the actuator assembly may comprise multiple valve pin coupling devices interconnected to the actuator plate each coupling, depending on the application, a single individual valve pin and the actuator plate, however it is possible that one valve pin coupling device couples multiple valve pins to the actuator plate. In order to interconnect the valve pin coupling device and the actuator plate, the actuator plate comprises at least one through-bore in the axial direction. Within the through-bore the valve pin coupling device is usually at least partially arranged.

For an easy switching of the valve pin coupling device between the coupled state and the decoupled state, the coupling device switching element is preferably in communication with the outside of the injection mold and therefrom switchable between the coupled first position and the decoupled second position.

With advantage, the coupling device switching element comprises a set pin extending in the axial direction and being displaceable in the axial direction having the decoupling recess extending inward in a radial direction. Alternatively or in addition, the coupling device switching element may comprise a set slider extending perpendicular to the axial direction and being displaceable perpendicular to the axial direction having the decoupling recess extending outward in a radial direction.

Depending on the field of application the coupling device second part can comprise a sleeve arranged at least partially between the coupling device first part and the actuator plate having the coupling recess extending outward in a radial direction. Alternatively, the coupling device second part may comprise a valve pin connector interconnected to the valve pin having the coupling recess extending inward in a radial direction.

Good result can be achieved, when the coupling device first part comprises a first opening in the axial direction which is at least partially encompassed by the side wall. Preferably the side wall encompasses the first opening and forms a hollow cylinder with the passage connecting the inside and the outside of the hollow cylinder. In this variation the first side face is on the outside of the hollow cylinder and the second side face is on the inside of the hollow cylinder. Displaceable within the passage a preferably spherical shaped coupling means is arranged, however depending on the field of application the coupling means can have various shapes and can be at least one out of the following: ball latch; ball bearing; ball plungers; cylindrical bearing; round end pin. With advantage, two or more passages are arranged in a symmetrical manner in the side wall and within each passage a ball shaped coupling means is arranged. Good results can be achieved when the side wall of coupling device first part partially encompasses the set pin, with the second side face facing the set pin. With advantage the sleeve is arranged on the outside of the coupling device first part adjacent to the first side face. During operation the sleeve is usually fixedly interconnected to the actuator plate in the axial direction.

In the coupled state the of the valve pin coupling device, the coupling device switching element is in the coupled first position. In a preferred variation the set pin in the coupled first position is pressing the ball shaped coupling means outward in a radial direction into the coupling recess arranged on the inside of the sleeve. The ball shaped coupling means are thereby partially arranged in the passage and partially in the coupling recess. Thereby the coupling device first part is coupled in the axial direction with coupling device second part.

In the decoupled state the of the valve pin coupling device, the coupling device switching element is in the decoupled second position. In a preferred variation the set pin is in the decoupled second position with the decoupling recess on the same level in the axial direction as the ball shaped coupling means. This allows the ball shaped coupling means to be displace inward in a radial direction and to be partially received by the decoupling recess. The ball shaped coupling means are not protruding above the second side face of the side wall compared to the situation in the coupled state. Thereby the coupling device first part is decoupled in the axial direction from coupling device second part.

For switching the coupling state of the valve pin coupling device, the injection mold preferably comprises a latching device accessible from the outside of the injection mold. The latching device is usually arranged displaceable and interconnected to the coupling device switching element, such that the coupling device switching element is displaceable between the coupled first position and the decoupled second position by means of the latching device. The switching of the coupling device switching element via the latching device can be done in a manual or automatic fashion e.g. by means of an electric motor or other means. If appropriate the latching device can be configured to secure the coupling device switching element in the coupled first position and/or in the decoupled second position. An easy handling of the valve pin coupling device can be achieved, when latching device comprises a latching device slider which is laterally accessible from the outside of the Injection mold and which is therefrom displaceable perpendicular to the axial direction between an engaging position, in which it exerts a force on the coupling device switching element, and a disengaging position.

In a preferred variation the latching device slider is attached to the top plate on the injection mold. The set pin extends in this variation through the top plate with a set pin end region, with which the latching device slider interacts, when moved from the disengaging position into the engaging position. The latching device slider may comprise in order to interact with the set pin end region a wedge-shaped slider end region.

The wedge-shaped slider end region usually comprises a slider surface, which is inclined relative to the axial direction for contacting with the set pin end region. This allows the latching device slider to displace the set pin between the coupled first position and the decoupled second position, resulting in an easy switching of the valve pin decoupling device by a displacement of the latching device slider.

In a variation of the injection mold with multiple valve pin coupling devices, the latching device may comprise multiple latching device sliders. Each latching device slider can switch one or more valve pin coupling devices. In some variations this is achieved by arranging the latching device sliders in a common plane perpendicular to the axial direction. Alternatively, or in addition, in some variations the latching device sliders can be arranged in a slider stacks of two or more latching device sliders stacked in the axial direction. Each latching device slider in the slider stack can switch one or more valve pin coupling devices, which have a set pin extending to the height of the associated slider stack layer. This would allow a compact construction, in which individual valve pin coupling devices can be switched by displacing the latching device slider in the respective layer of the slider stack or a group of valve pin coupling devices associated to the slider stack by displacing the slider stack as a whole.

For best performance the valve pin coupling device may further comprise a spring element which is configured to be compressed during a displacement of the set pin from the coupled first position into the decoupled second position. The spring element provides the means to reverse the switching once the slider is moved from the engaging position back into the disengaging position. To achieve this, the spring element is preferably arranged between the set pin and the coupling means body and exerts a separating force therebetween in the axial direction in the decoupled state.

With advantage, a securing element is interconnected to the set pin and interacts with the top plate and/or the coupling device first part, such that the securing element limits the displacement of the set pin in the axial direction relative to the coupling device first part. Good results are possible, when the securing element is detachably or fixedly arranged in a second opening of the set pin extending perpendicular to the axial direction.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing:

FIG. 3 a perspective view of the first variation of an injection mold according to FIG. 1;

FIG. 4 a cropped section view across the variation according to FIG. 3 along section line II;

FIG. 5 a detailed view of the variation according to FIG. 4 also displaying hidden edges, indicated by the box in FIG. 4;

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
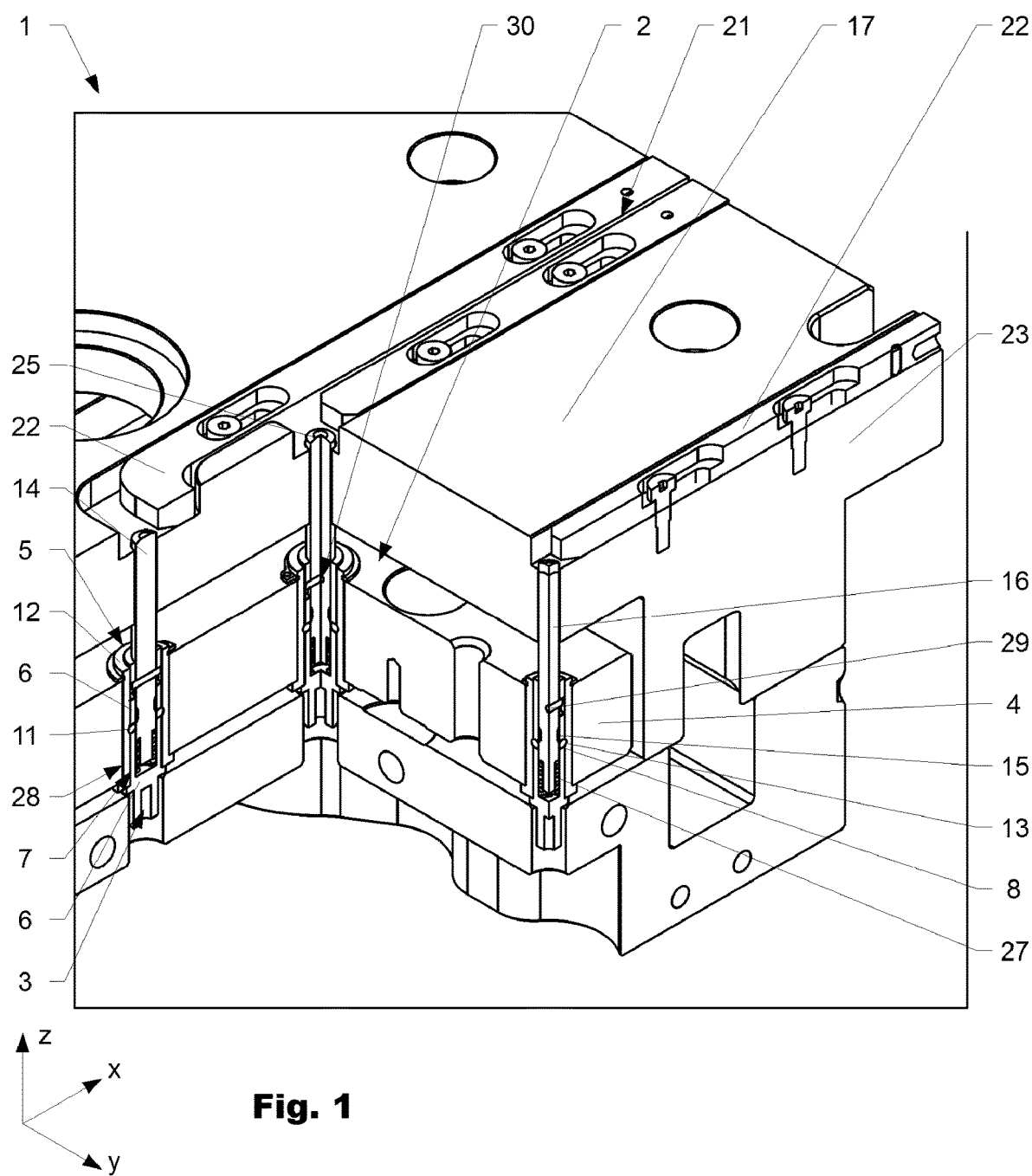
FIG. 1 a first variation of an injection mold in a perspective manner in a partially sectioned view.
Figure 2:
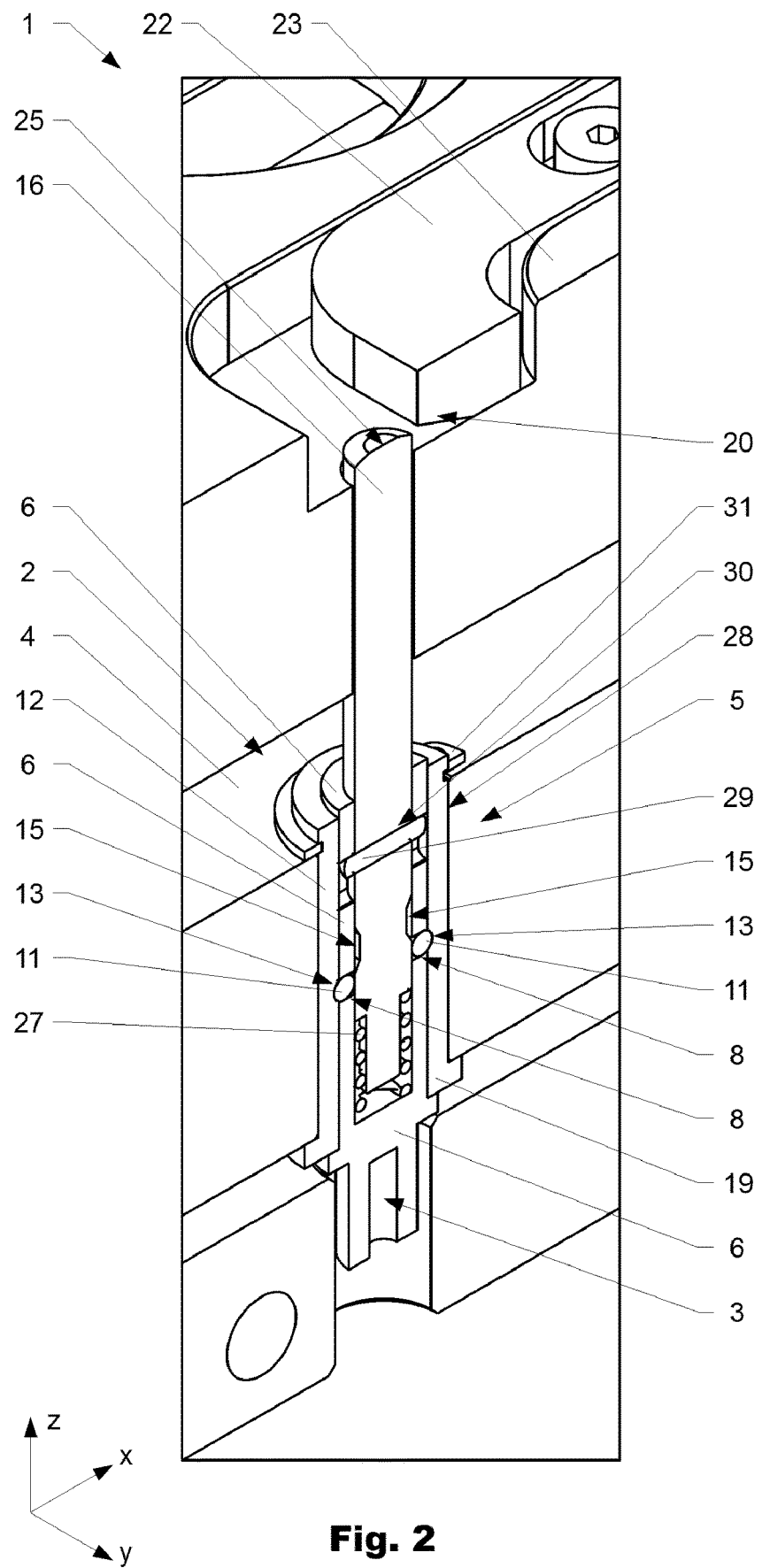
FIG. 2 a detailed view of the sectioned view FIG. 1.
Figure 6:
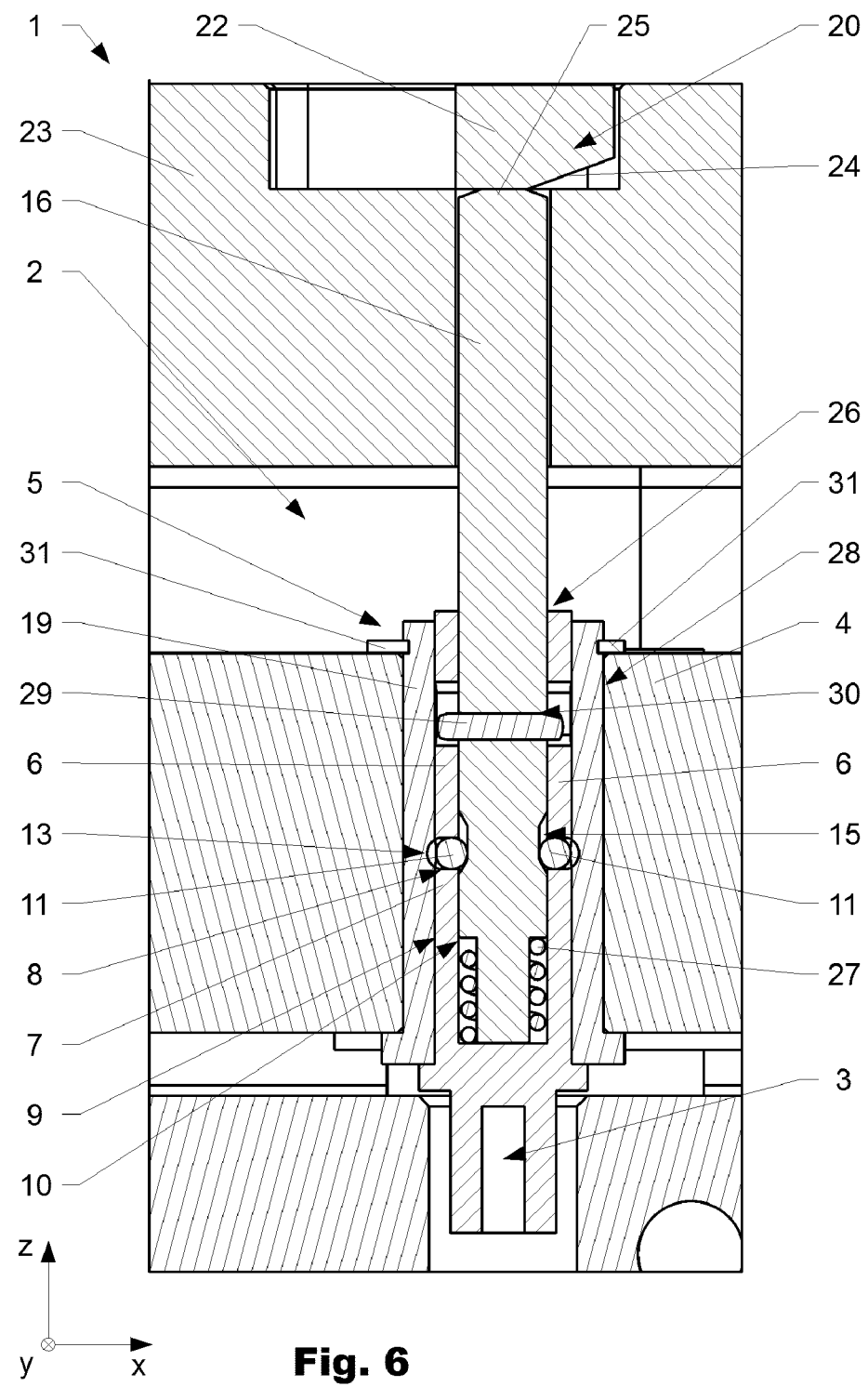
FIG. 6 a cropped section view across the variation according to FIG. 3 along section line II.
Figure 7:
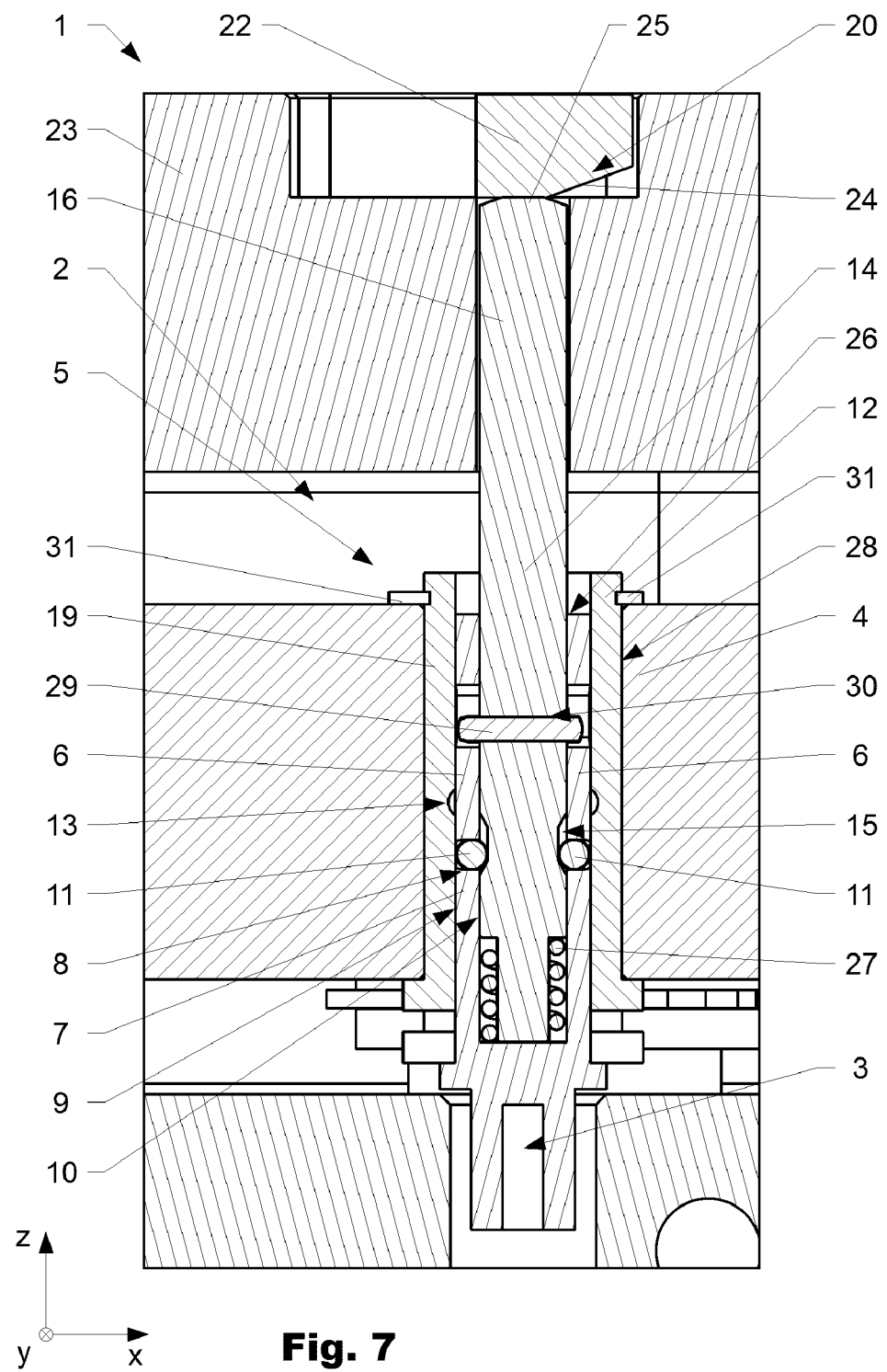
FIG. 7 a cropped section view across the variation according to FIG. 3 along section line II.
Figure 8:
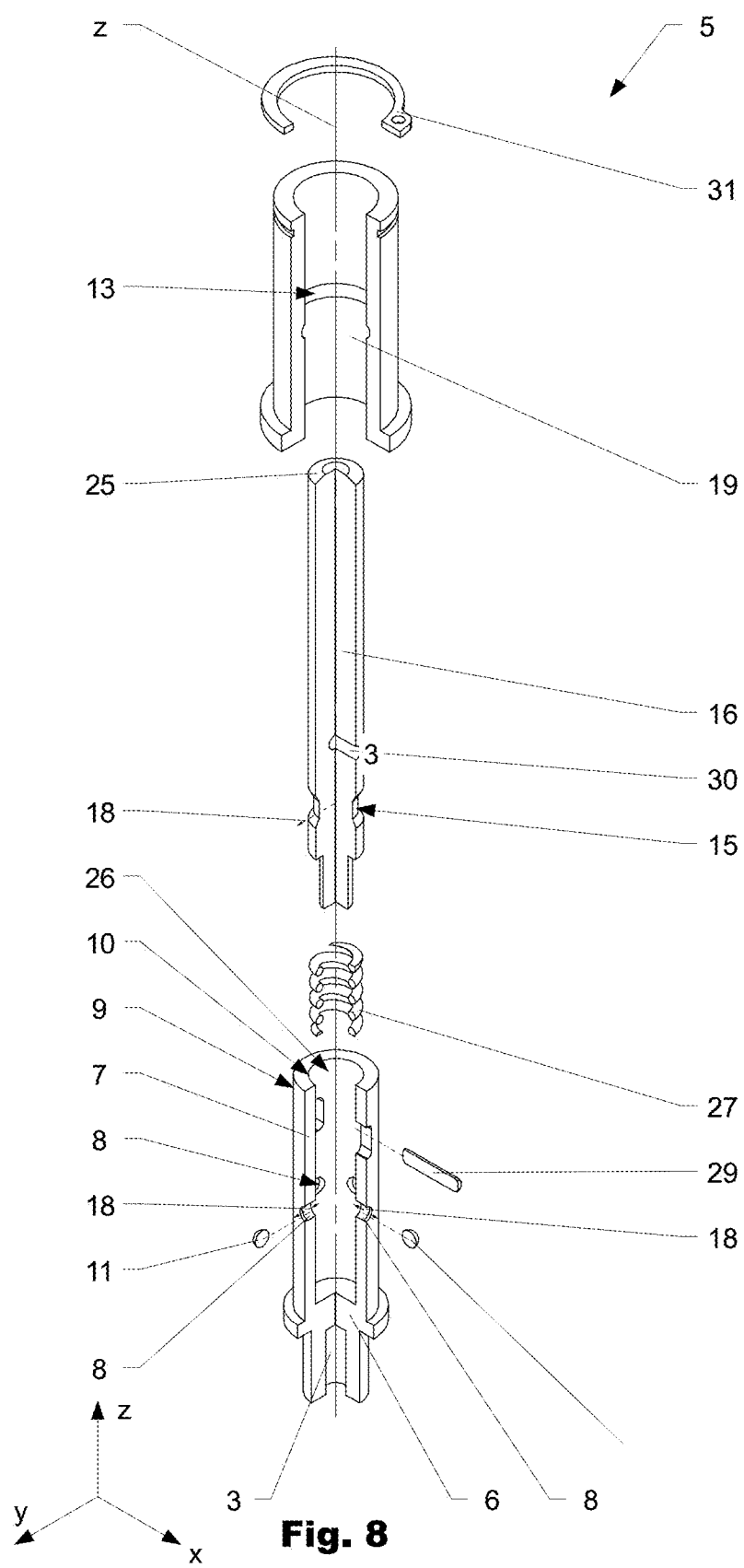
FIG. 8 a partially sectioned and exploded view of a first variation of a valve pin coupling device.

FIG. 1 shows a first variation of an injection mold 1 in a perspective manner in a partially sectioned view. FIG. 2 shows a detailed view of the sectioned view FIG. 1. FIG. 3 shows in a perspective view the first variation of an injection mold 1 according to FIG. 1. FIG. 4 shows a cropped section view across the variation according to FIG. 3 along section line II. FIG. 5 shows a detailed view of the variation according to FIG. 4 also displaying hidden edges, indicated by the box in FIG. 4. FIG. 6 shows a cropped section view across the variation according to FIG. 3 along section line II. FIG. 7 shows a cropped section view across the variation according to FIG. 3 along section line II and FIG. 8 shows a first variation of a valve pin coupling device 6 in a partially sectioned and exploded view.

In FIGS. 1 and 3 a first variation of an injection mold 1 according to the disclosure is shown, which comprises an actuator assembly 2. The actuator assembly 2 comprises a displaceable actuator plate 4 for actuating at least one valve pin 3 during operation in an axial direction z. The actuator plate 4 is arranged in the axial direction z between a top plate 23 and a nozzle plate into which the valve pin 3 extends in the axial direction z, in order open and close a valve gate, which is adjacent a cavity of the injection mold 1.

The actuator assembly 2 further comprises a valve pin coupling device 5, as best visible in FIGS. 2 and 4 to 8, which interconnects the valve pin 3, which is indicated in FIG. 4, and the actuator plate 4 in the axial direction z. The valve pin coupling device 5 is interconnected to the actuator plate 4 and is manually switchable between a coupled state and a decoupled state. In the coupled state of the valve pin coupling device, which is visible in FIGS. 4 and 5 for the first variation, the valve pin 3 in the axial direction z is interconnected to the actuator plate 4. Accordingly, in the decoupled state of the valve pin coupling device, which is shown in FIGS. 6 and 7 for the first variation, the valve pin 3 in the axial direction z is disconnected from the actuator plate 4.

The actuator assembly 2 of the first variation shown in FIG. 1 comprises multiple valve pin coupling devices 5 interconnected to the actuator plate 4 each coupling a single valve pin 3 to the actuator plate 4. More particularly, the actuator plate 4 comprises a through-bore 28 in the axial direction z for each valve pin coupling devices 5, which are partially arranged within the respective through-bore 28.

The construction of the valve pin coupling device 5 can be easily seen in FIG. 8, which shows a first variation of the valve pin coupling device 5 in a partially sectioned and exploded view. As illustrated, the valve pin coupling device 5 comprises a coupling device first part 6, a coupling device second part 12, a coupling device switching element 14 and at least one coupling means 11. The coupling device first part 6 has a side wall 7 extending in the axial direction z, and comprises at least one passage 8 extending across the side wall 7 from a first side face 9 to a second side face 10. Inside the passage 8 at least one coupling means 11 is arranged displaceable in the passage 8. The coupling means 11 protrudes at least above one of the first side face 9 or the second side face 10 of the side wall 7. The coupling device second part 12 is arranged adjacent to the first side face 9, comprising a coupling recess 13 suitable to receive the coupling means 11 protruding above the first side face 9. The coupling device switching element 14 is arranged adjacent to the second side face 10 and comprises a decoupling recess 15. The coupling device switching element 14 is arranged displaceable with respect to the coupling device first part 6 between a coupled first position and a decoupled second position.

In the coupled first position, as exemplarily shown in FIG. 4, the coupling means 11 arranged in the passage 8 of the coupling device first part 6 is pressed via the coupling device switching element 14 into the coupling recess 13 of the coupling device second part 12, thereby coupling the coupling device first part 6 and the coupling device second part 12. In the decoupled second position, which is shown in FIGS. 6 and 7, the coupling means 11 arranged in the passage 8 of the coupling device first part 6 is partially arranged in the decoupling recess 15 such that the coupling device first part 6 and the coupling device second part 12 are decoupled from each other.

For an easy switching of the valve pin coupling device 4 between the coupled state and the decoupled state, the coupling device switching element 14 is in communication with the outside of the injection mold 1 and therefrom displaceable between the coupled first position and the decoupled second position. This is achieved in the shown variation in that the coupling device switching element 14 comprises a set pin 16 extending in the axial direction z and being displaceable in the axial direction z having the decoupling recess 15 extending inward in a radial direction 18. This first variation is illustrated in FIGS. 1, 2 and 4 to 7. Furthermore, the coupling device second part comprises a sleeve 19 arranged partially between the coupling device first part 6 and the actuator plate 4 having the coupling recess 13 extending outward in a radial direction 18.

Between the set pin 16 and the sleeve 19 the coupling device first part 6 is arranged, which comprises a first opening 26 in the axial direction z which is encompassed by the side wall 7 and forms a hollow cylinder. The passage 8 connects the inside and the outside of the hollow cylinder. In this variation, as best observable in FIGS. 2 and 8, the first side face 9 is on the outside of the hollow cylinder and the second side face 10 is on the inside of the hollow cylinder. Displaceable within the passage 8 arranged is a ball shaped coupling means 11. The shape of the coupling means 11 of the first variation, is best visible in FIG. 5 as the shown hidden edges reveal the coupling means in the form of balls. The same is observable in FIG. 8. For a good coupling performance and an easy switching four passages 8 are arranged in a symmetrical manner in the side wall 7 and within each passage 8 a ball shaped coupling means 11 is arranged. The set pin 16 is partially accommodated inside the first opening 26, with the second side face 10 of the side wall 7 adjacent to the set pin 16. Arranged adjacent to the first side face 9 of the side wall 7 on the outside of the hollow cylinder is the sleeve 19. During operation the sleeve 19 is usually fixedly interconnected to the actuator plate 4 in the axial direction z and held in position relative to the actuator plate 4 in the axial direction z by a retaining ring 31.

In the coupled state of the first variation shown in FIGS. 4 and 5 of the valve pin coupling device 5 the coupling device switching element 14 is in the coupled first position. The set pin 16 in the coupled first position is pressing the ball shaped coupling means 11 outward in a radial direction 18 into the coupling recess 13 arranged on the inside of the sleeve 19. The ball shaped coupling means 11 are thus partially arranged in the passage 8 and partially in the coupling recess 13. Thereby the coupling device first part 6 is coupled in the axial direction z with the sleeve 19.

In the decoupled state of the first variation, as shown in FIGS. 6 and 7 of the valve pin coupling device 5 the coupling device switching element 14 is in the decoupled second position. The decoupling recess 15 of the set pin 16 is in the decoupled second position of the set pin 16 on the same level in the axial direction z as the ball shaped coupling means 11. This allows the ball shaped coupling means 11 to be displaced inwardly in a radial direction 18 and to be partially received by the decoupling recess 15. The ball shaped coupling means 11 are not protruding above the second side face 10 of the side wall 7. Thereby the coupling device first part 6 is decoupled in the axial direction z from the sleeve 19. In FIG. 7 compared to FIG. 6 the actuator plate 4 is displaced in the axial direction z towards the top plate 23. Since the coupling device first part 6 is decoupled from the sleeve 19 in the axial direction z, only the sleeve 19 is displaced with the actuator plate 4. The coupling device first part 6 and the thereto interconnected valve pin 3 are not displaced, which leads to the valve gate not being opened, meaning the cavity is switched off.

For manually controlling the coupling state of the valve pin coupling device 4, the injection mold 1 comprises a latching device 21 accessible from the outside of the injection mold 1. The latching device 21, as shown in FIGS. 1 to 4 and 6 to 7, is arranged displaceable and interconnected to the coupling device switching element 14, such that the coupling device switching element 14 is displaceable between the coupled first position and the decoupled second position by means of the latching device. In the shown first variation, the latching device 21 is configured to secure the coupling device switching element 14 in the decoupled second position, illustrated in FIGS. 6 and 7. An easy handling of the valve pin coupling device 5 is achieved, as latching device 21 comprises a latching device slider 22 which is laterally accessible from the outside of the Injection mold 1 and which is therefrom displaceable perpendicular to the axial direction z between an engaging position, in which it exerts a force on the coupling device switching element 14 and a disengaging position. The latching device slider 22 is, as best visible in FIGS. 1 and 3, attached to the top plate 23 of the injection mold 1. The latching device slider 22 is furthermore arranged inside a groove of the top plate 23, such that it does not protrude above a side face of the top plate 23.

In the shown first variation, the set pin 16 extends through the top plate 23 with a set pin end region 25, with which the latching device slider 22 interacts, when moved from the disengaging position into the engaging position, as illustrated in FIGS. 6 and 7. In order to interact with the set pin end region 25 the device slider 22 comprises a wedge-shaped slider end region 20. When moving the latching device slider 22 from the disengaging position into the engaging position, the wedge-shaped slider end region 20 makes contact with the set pin end region 25. In particular, a slider surface 24 of wedge-shaped slider end region 20, which is inclined relative to the axial direction z contacts with the set pin end region 25, as shown in FIGS. 4, 6 and 7. As the wedge-shaped slider end region 20 and thus the inclined slider surface 24 is moved past the set pin end region 25, it pushes the set pin 16 in the axial direction z towards the nozzle plate. This allows the latching device slider 22 to displace the set pin 16 between the coupled first position and the decoupled second position, resulting in an easy switching of the valve pin 3 decoupling device by a displacement of the latching device slider 22.

For best performance the valve pin coupling device 4 further comprises a spring element 27, observable in FIG. 8, which is compressed during a displacement of the set pin 16 from the coupled first position into the decoupled second position. This becomes obvious in the first variation when comparing the spring element 27 in FIG. 4 to the same spring element 27 in FIGS. 6 and 7. The spring element 27 provides the means to reverse the switching process once the slider is moved from the engaging position back into the disengaging position. For this reason, the spring element 27 is arranged between the set pin 16 and the coupling means 11 body and exerts a separating force therebetween in the axial direction z in the decoupled state.

The shown first variation further comprises a securing element 29, which is interconnected to the set pin 16 limiting its movement in the axial direction z relative to the coupling device first part 6 by interacting the coupling device first part 6. As best visible in FIGS. 2, 4 and 6 to 8, the securing element 29 is detachably arranged in a second opening 30 of the set pin 16 extending perpendicular to the axial direction z.

Rather, the words used in the specification are words of description rather than 11 limitation, and it is understood that various changes may be made without departing from scope of the invention.

LIST OF DESIGNATIONS

1 Injection mold
2 Actuator assembly
3 Valve pin
4 Actuator plate
5 Valve pin coupling device
6 Coupling device first part
7 Side wall
8 Passage (side wall)
9 First side face
10 Second side face
11 Coupling means
12 Coupling device second part
13 Coupling recess
14 Coupling device switching element
15 Decoupling recess
16 Set pin
18 Radial direction
19 Sleeve
20 wedge-shaped slider end region
21 Latching device
22 Latching device slider
23 Top plate
24 Slider surface (inclined)
25 Set pin end region
26 First opening (coupling device first part)
27 Spring element
28 Through-bore (actuator plate)
29 Securing element
30 Second opening (set pin)
31 Retaining ring

The invention claimed is:

1. An injection mold (1) comprising an actuator assembly (2) for actuating at least one valve pin (3), which comprises:
 a. a displaceable actuator plate (4) for actuating at least one valve pin (3) during operation in an axial direction (z); and
 b. a valve pin coupling device (5) interconnecting the at least one valve pin (3) and the actuator plate (4) in the axial direction (z) manually switchable between;
  i. a coupled state in which the at least one valve pin (3) in the axial direction (z) is interconnected to the actuator plate (4); and
  ii. a decoupled state in which the at least one valve pin (3) in the axial direction (z) is disconnected from the actuator plate (4); wherein
 c. the valve pin coupling device (5) is interconnected to the actuator plate (4) and comprises:
  i. a coupling device first part (6) having a side wall (7) extending in the axial direction (z) and comprising at least one passage (8) extending across the side wall (7) from a first side face (9) to a second side face (10) and in which a coupling means (11) is arranged displaceable in the at least one passage (8) and which protrudes at least above one of the first side face (9) or the second side face (10) of the side wall (7);
  ii. a coupling device second part (12) arranged adjacent to the first side face (9), comprising a coupling recess (13) suitable to receive the coupling means (11) protruding above the first side face (9); and
  iii. a coupling device switching element (14) arranged adjacent to the second side face (10) and comprising a decoupling recess (15) being arranged displaceable with respect to the coupling device first part (6) between
   1. a coupled first position in which the coupling means (11) arranged in the at least one passage (8) of the coupling device first part (6) is pressed via the coupling device switching element (14) into the coupling recess (13) of the coupling device second part (12), thereby coupling the coupling device first part (6) and the coupling device second part (12); and
   2. a decoupled second position in which the coupling means (11) arranged in the at least one passage (8) of the coupling device first part (6) is partially arranged in the decoupling recess (15) such that the coupling device first part (6) and the coupling device second part (12) are decoupled from each other.

2. The injection mold (1) according to claim 1, wherein the coupling device switching element (14) is in communication with an outside of the injection mold (1) and therefrom displaceable between the coupled first position and the decoupled second position.

3. The injection mold (1) according to claim 1, wherein the coupling device switching element (14) comprises:
   a. a set pin (16) extending in the axial direction (z) and being displaceable in the axial direction (z) having the decoupling recess (15) extending inward in a radial direction (18); or
   b. a set slider extending perpendicular to the axial direction (z) and being displaceable perpendicular to the axial direction (z) having the decoupling recess (15) extending outward in a radial direction (18).

4. The injection mold (1) according to claim 1, wherein the coupling device second part (12) comprises"
   a sleeve (19) arranged at least partially between the coupling device first part (6) and the actuator plate (4) having the coupling recess (13) extending outward in a radial direction (18).

5. The injection mold (1) according to claim 3, wherein a latching device (21) accessible from the outside of the injection mold (1) is arranged displaceable and interconnected to the coupling device switching element (14), such that the coupling device switching element (14) is displaceable between the coupled first position and the decoupled second position by means of the latching device (21).

6. The injection mold (1) according to claim 5, wherein the latching device (21) is configured to secure the coupling device switching element (14) in the coupled first position and/or in the decoupled second position.

7. The injection mold (1) according to claim 5, wherein the latching device (21) comprises a latching device slider (22) which is laterally accessible from the outside of the injection mold (1), and which is therefrom displaceable perpendicular to the axial direction (z) between:
   a. an engaging position, in which it exerts a force on the coupling device switching element (14); and
   b. a disengaging position.

8. The injection mold (1) according to claim 7, wherein the latching device slider (22) comprises a wedge-shaped slider end region (20) for interacting with a set pin end region (25).

9. The injection mold (1) according to claim 1, wherein the actuator plate (4) is arranged in the axial direction (z) between a top plate (23) and a nozzle plate into which the at least one valve pin (3) extends in the axial direction (z).

10. The injection mold (1) according to claim 7, wherein the latching device slider (22) is attached to the top plate (23).

11. The injection mold (1) according to claim 7, wherein the set pin (16) extends through the top plate (23) with the set pin end region (25), with which the latching device slider (22) interacts, when moved from the disengaging position into the engaging position.

12. The injection mold (1) according to claim 1, wherein the coupling device first part (6) comprises a first opening (26) in the axial direction (z) which is at least partially encompassed by the side wall (7).

13. The injection mold (1) according to claim 3, wherein the side wall (7) of coupling device first part (6) partially encompasses the set pin (16).

14. The injection mold (1) according to claim 3, wherein the valve pin coupling device (5) further comprises a spring element (27) which is configured to be compressed during a displacement of the set pin (16) from the coupled first position into the decoupled second position.

15. The injection mold (1) according to claim 14, wherein the spring element (27) is arranged between the set pin (16) and the coupling device first part (6) and exerts a separating force in the decoupled state therebetween in the axial direction (z).

16. The injection mold (1) according to claim 1, wherein the actuator plate (4) comprises at least one through-bore (28) in the axial direction (z).

17. The injection mold (1) according to claim 16, wherein the valve pin coupling device (5) is at least partially arranged in the at least one through-bore (28) of the actuator plate (4).

18. The injection mold (1) according to claim 1, wherein the coupling means (11) of the valve pin coupling device (5) are at least one out of the following: ball latch; ball bearing; ball plungers; cylindrical bearing; round end pin.

19. The injection mold (1) according to claim 3, wherein a securing element (29) is interconnected to the set pin (16) and interacts with the top plate (23) and/or the coupling device first part (6), such that the securing element (29) limits the displacement of the set pin (16) in the axial direction (z) relative to the coupling device first part (6).

20. The injection mold (1) according to claim 19, wherein the securing element (29) is detachably or fixedly arranged in a second opening (30) of the set pin (16) extending perpendicular to the axial direction (z).

* * * * *